United States Patent
Baker et al.

[11] Patent Number: 6,124,015
[45] Date of Patent: Sep. 26, 2000

[54] MULTI-PLY INDUSTRIAL FABRIC HAVING INTEGRAL JOINTING STRUCTURES

[75] Inventors: Samuel M. Baker, Carleton Place, Canada; Eugene Fekete, Dunwoody, Ga.; Rajat K. Chakravarty, Kanata, Canada

[73] Assignee: JWI Ltd., Kanata, Canada

[21] Appl. No.: 08/835,432

[22] Filed: Apr. 9, 1997

(Under 37 CFR 1.47)

Related U.S. Application Data

[63] Continuation-in-part of application No. 08/634,437, Apr. 18, 1996, abandoned.

[51] Int. Cl.$^7$ .............................. B32B 3/06; A44B 17/00
[52] U.S. Cl. ........................ 428/99; 428/100; 428/163; 428/198; 428/223; 442/239; 442/268; 442/381
[58] Field of Search ............................. 428/198, 99, 100, 428/162, 163, 223; 442/208, 239, 268, 381

[56] References Cited

U.S. PATENT DOCUMENTS

| | | |
|---|---|---|
| 3,097,413 | 7/1963 | Draper, Jr. . |
| 3,943,981 | 3/1976 | De Brabander . |
| 4,271,222 | 6/1981 | Hahn . |
| 4,781,967 | 11/1988 | Legge et al. . |
| 4,784,890 | 11/1988 | Black . |
| 4,842,905 | 6/1989 | Stech . |
| 5,032,122 | 7/1991 | Noel et al. . |
| 5,077,870 | 1/1992 | Melbye et al. . |
| 5,119,531 | 6/1992 | Berger et al. . |
| 5,132,141 | 7/1992 | Schon . |
| 5,171,389 | 12/1992 | Stigberg . |
| 5,196,092 | 3/1993 | Stigberg . |
| 5,238,537 | 8/1993 | Dutt . |
| 5,268,076 | 12/1993 | Best et al. . |
| 5,326,612 | 7/1994 | Goulait . |
| 5,360,656 | 11/1994 | Rexfelt et al. . |
| 5,369,852 | 12/1994 | Higashinaka . |
| 5,369,853 | 12/1994 | Okawa et al. . |
| 5,525,194 | 6/1996 | Jermo . |
| 5,607,635 | 3/1997 | Melbye et al. . |
| 5,660,912 | 8/1997 | Menzel . |
| 5,761,775 | 6/1998 | Legome . |

FOREIGN PATENT DOCUMENTS

| | | |
|---|---|---|
| 33 195/78 | 8/1979 | Australia . |
| 68 890/81 | 10/1981 | Australia . |
| 69 720/87 | 11/1987 | Australia . |
| 18 007/95 | 9/1995 | Australia . |
| 2065903 | 10/1992 | Canada . |
| 2068800 | 11/1992 | Canada . |
| 0 497 620 | 8/1992 | European Pat. Off. . |
| 37 35 709 | 5/1989 | Germany . |
| 975750 | 11/1964 | United Kingdom . |

OTHER PUBLICATIONS

Derwent translation of Abstract for AO, Germany 37 35 709, May 1989.

*Primary Examiner*—Blaine Copenheaver
*Attorney, Agent, or Firm*—Larson & Taylor PLC

[57] ABSTRACT

A substantially planar jointed multi-layer industrial fabric, assembled from at least one segment comprising at least one woven or nonwoven ply, in which the joints utilize jointing yarns or formed structures. The jointing yarns or formed structures are placed at selected locations, such as the lateral edges, of at least one planar surface of a ply of the at least one, or first, fabric segment, and interlock in mating engagement with corresponding jointing yarns or formed structures either in at least one surface of a ply of a second segment, or in another location on the first fabric segment, to provide an integral joint. The joints are comprised of shaped yarns and formed structures which in any combination form mating engagements substantially within the plane of the fabric, such as in hook-and-loop or slot-and-rib type joints, and the like. The fabric is assembled by engaging and interlocking the jointing yarns or formed structures, for example by overlapping the segments, in either a spiral winding process or piecewise fashion, so that the jointing yarns or structures provided in the segment ply are engaged and interlocked. Further secondary processing of the joint is not required. The at least one segment may be a single continuous strip, a plurality of strips, or panels, into which the jointing structures have been incorporated.

25 Claims, 10 Drawing Sheets

MULTI-PLY INDUSTRIAL FABRIC HAVING INTEGRAL JOINTING STRUCTURES

This application is a continuation-in-part of U.S. Ser. No. 08/634,437 filed Apr. 18, 1996 now abandoned.

FIELD OF THE INVENTION

The present invention concerns multi-layer industrial fabrics. It is particularly concerned with fabrics assembled from a multiplicity of pieces, each of which is smaller than the completed fabric, and in which a jointing means is incorporated in the component pieces substantially in the plane of the completed fabric. The invention allows for modification of the dimensional properties of the fabric as it is assembled, and reduces the time required for fabric manufacture.

In the following description of this invention, the following six terms have the meaning indicated:

"segment" means a unit or piece from which the fabric is assembled by engaging the jointing structures "ply" means each material used in a segment; a segment may include plies made from more than one material;

"layer" means the parts of a segment or segments superposed one on the other and providing the two parts of an interlocking joint;

"continuous" or "discontinuous" refer to the jointing structures: a continuous jointing structure is one having a significant length (eg a rib-and-slot arrangement), whilst a discontinuous jointing structure is composed of a plurality of individual structures (eg a hook-and-loop arrangement);

"plane of the fabric", refers to the location of the assembled joints, which is within the fabric, between the faces of the two superposed layers making up the joint, each of which are substantially parallel to the outermost faces of the fabric.

Thus the fabrics of this invention are potentially multi-layer fabrics, assembled from potentially a plurality of segments, each of which may include a plurality of plies.

DISCUSSION OF THE PRIOR ART

The dimensions of fabrics which can be woven by conventional methods are dictated by the limitations imposed by the loom construction. The known manufacturing methods are slow, and little or no flexibility is available to adjust or change the dimensions or physical composition the fabric, during production. Numerous attempts have been made to design nonwoven and modular fabrics which may be assembled quickly, and produced with relatively smaller equipment, such as the following:

(1) Assembling fabrics from one or more nonwoven arrays of yarns, webs or woven bands which are subsequently bonded, needled or otherwise attached together to form a cohesive structure; see U.S. Pat. No. 3,097,413 (Draper, Jr.), GB 975,750 (Plate), or U.S. Pat. No. 4,781,967 (Legge et al.).

(2) Spiralling successive strips or layers of nonwoven, woven or knitted textiles to form a fabric substrate, and subsequently bonding these layers or strips together by needling, sewing, welding or the like to create the finished fabric; see U.S. Pat. No. 5,268,076 (Best et al.) or U.S. Pat. No. 5,360,656 (Rexfelt et al.).

(3) Assembling a fabric from preformed interlocking elements interconnected by complementary geometric shapes; see U.S. Pat. No. 4,842,905 (Stech) or DE 3,735,709 (Halker).

A disadvantage common to all of these known methods is that the precursor fabric as it is assembled from its components lacks structural integrity due to a lack of cohesion between its constituent parts. Such a delicate fabric can only be handled with great care, and cannot be installed on the machine for which it is intended until it has been subjected to a secondary process, such as needling, sewing, or another bonding process. For example, when only lateral edge faces are used for the alignment with adjacent edges of a spiral strip, as in U.S. Pat. No. 5,360,656, the precise alignment necessary to provide a secure joint between them is difficult to attain. If the joint is made by gluing, melting together or welding, the strength of the resulting joint is limited by the strength of the adhesive, the available surface area of the lateral edge faces used, and the strength of the weld. If the joint is sewn, the joint strength will be limited by the strength of the sewing thread, and the ease with which the thread may be pulled out of the fabric at that point.

Other methods, such as overlapping successive pieces, usually require a time-consuming and expensive secondary process to attach the pieces together to provide a cohesive structure. In some cases, the overlapping can introduce discontinuities that create difficulties in using the finished product. Further, gluing, sewing, welding or melt joining can disrupt the uniformity of the assembled fabric, again creating difficulties in using the finished product, and the properties of the adhesive or the sewing yarn used in the joint must be compatible with the end use of the assembled fabric.

In some cases, it is desirable to have the ability to seam, or make the final assembly, of the fabric on the apparatus for which it is intended. If secondary processes such as needling, sewing or gluing are required to do this, their applicability will be limited by the space and precision available at the apparatus, as well as the time available for assembly. It is not possible to make an on-machine seam in a paper making machine press section felt by needling the opposing ends together in the press section. The applicability of processes such as gluing or sewing for on-machine assembly are also limited, due to the precision required, the available working space, and the time available to install the fabric. In some applications pin seams are used, but since a pin seam introduces a discontinuity their use is limited. If a seam is not created with sufficient care the seamed fabric can be unacceptable for its intended purpose.

SUMMARY OF THE INVENTION

The present invention seeks to provide an industrial fabric that overcomes these difficulties. The industrial fabric of this invention is assembled from at least one segment. The, or each, segment has integral jointing structures incorporated into at least one ply at selected locations, and which are continuous, or discontinuous. The jointing structures engage with, and interlock with, each other to provide a secure mating engagement at selected locations on the segment, or segments, making up the fabric.

The planar surfaces forming the joints are in the plane of the finished fabric, and thus are not edge-to-edge joints. The fabric structure is assembled by interlocking together as many segments as are needed, to provide the required finished industrial fabric, and the same jointing structures may be used for final assembly of the fabric onto a machine. When at least two segments are incorporated into the fabric, each segment may be identical, or segments having differing physical properties may be used. The interlocked joint provides the fabric with more than adequate cohesion as it is assembled, without requiring any secondary processing. In some industrial applications this cohesion facilitates secondary processing, such as the needling of a nonwoven batt to at least one surface. In the present invention by incorporating jointing structures into the cooperating surfaces of the segments, a positive and strong joint can be obtained between the segments in one process.

In a first broad embodiment, this invention seeks to provide an industrial fabric comprising at least one segment including at least one ply, wherein in the fabric:

(a) the, or each, segment includes, in at least one face which is substantially parallel to the plane of the fabric, a ply including integral jointing structures incorporated into the ply at selected locations of the face of the segment; and (b) the jointing structures incorporated into the or each ply comprise formed structures which engage with, and interlock with, each other to provide a joint between the selected locations.

In a second more limited embodiment, this invention seeks to provide an industrial fabric comprising at least one segment including at least one ply, wherein in the fabric:

(a) the, or each, segment includes, in at least one face which is substantially parallel to the plane of the fabric, a woven ply including integral jointing structures woven into the ply at selected locations of the face of the segment; and (b) the jointing structures woven into the or each woven ply comprise shaped yarns which engage with, and interlock with, each other to provide a joint between the selected locations.

In a third more limited embodiment, this invention seeks to provide an industrial fabric comprising at least one segment including at least one ply, wherein in the fabric:

(a) the, or each, segment includes, in at least one face which is substantially parallel to the plane of the fabric, a nonwoven ply including integral jointing structures incorporated into the ply at selected locations of the face of the segment; and (b) the jointing structures incorporated into the or each nonwoven ply comprise shaped structures which engage with, and interlock with, each other to provide a joint between the selected locations.

In a fourth more limited embodiment, this invention seeks to provide an industrial fabric comprising at least two segments including at least a first segment including at least one woven ply, and at least a second segment including at least one nonwoven ply, wherein in the fabric:

(a) the, or each, first segment includes, in at least one face which is substantially parallel to the plane of the fabric, a woven ply including integral jointing structures woven into the ply at selected locations of the face of the segment;

(b) the, or each, second segment includes, in at least one face which is substantially parallel to the plane of the fabric, a nonwoven ply including integral jointing structures incorporated into the ply at selected locations of the face of the segment; and (c) the jointing structures incorporated into the, or each, segment ply comprise shaped structures which engage with, and interlock with, each other to provide a joint between the selected locations.

Preferably, the segments are chosen from at least one member from the group consisting of: at least one single ply continuous strip, at least one multi-ply continuous strip, at least two different single ply continuous strips, at least two different multi-ply continuous strips, at least one single ply panel, at least one multi-ply panel, at least two different single ply panels, and at least two different multi-ply panels.

Preferably, where a ply including the jointing structures is a woven ply, the jointing structures are incorporated into the ply at the selected locations during the weaving process as a portion of either the warp or the weft yarns. More preferably, in such a woven ply the integral jointing structures comprise a portion of the warp yarns.

Preferably, where a ply including the jointing structures is a nonwoven ply, the jointing structures are incorporated into the ply at the selected locations during the process of making the ply. Conveniently, such a nonwoven ply is made by a process such as moulding, extrusion and thermoforming.

Preferably, where a segment includes at least one woven ply, the or each woven ply is woven by a flat weaving process.

Preferably, the integral jointing structures are discontinuous within the selected location on a ply, and are selected from the group consisting of hook structures, loop structures, hook and loop structures, and mushroom type hermaphroditic structures.

Preferably, the integral jointing structures are continuous within the selected location on a ply, and are selected from the group consisting of slot-and-rib structures.

Preferably, where the assembled fabric includes both woven and nonwoven plies the jointing structures are interlocking slot-and-rib structures.

Preferably, where the assembled fabric includes only nonwoven plies, the jointing structures are selected from the group consisting of hook-and-loop structures, mushroom type hermaphroditic structures and slot-and-rib structures.

Preferably, the segments include one or more plies having a discontinuous jointing structure over at least one face. More preferably, the segments include one or more plies comprising a hook-and-loop type woven or nonwoven material, similar to that known as Velcro (Registered trade mark of Velcro Industries B.V.), in which the hooks and loops are oriented in a more or less perpendicular direction to the plane of the material. Preferably, each segment joint comprises in combination at least one ply having hooks therein interlocked with at least one ply having loops therein. Alternatively, the segments include one or more plies having mating mushroom type hermaphroditic structures such as those described by Melbye et al in U.S. Pat. No. 5,077,870. In a first option, each segment joint comprises at least one first ply having hooks therein interlocked with at least one second ply having hooks therein. In a second option, each segment joint comprises at least one first ply having both hooks and loops therein, interlocked with at least one second ply having both hooks and loops therein. In a third option, each segment joint comprises at least one first ply having mushroom type structures therein interlocked with at least one second ply having loops therein. In a fourth option, each segment joint comprises at least one first ply having mushroom type structures therein interlocked with at least one second ply having mushroom structures therein.

The integral jointing structures may be located in only a portion of one, or both, of the planar surfaces of the segment; for example, in the margins of the segment. Alternatively, the jointing structures may be located at regular intervals over one entire planar surface of a segment, so that interlocking takes place over substantially the entire face area of each segment. It is also possible to locate the jointing structures at regular intervals over both planar surfaces of the segments.

The plies used in a segment, both woven and nonwoven, are chosen to suit the end use of the fabric. Examples of nonwoven ply materials include felt, fibrous materials such as batt fibres, elastomeric foam in sheet form, film, and melt blown, spun laced or hydroentangled fibres, moulded structures, reaction extruded structures, thermoformed structures, and the like.

Preferably, the industrial fabric structures of this invention are assembled by applying a spiral winding method similar to that disclosed in U.S. Pat. No. 5,268,076 or U.S. Pat. No. 5,360,656, to a segment in the form of a continuous strip. Preferably, when the fabric is created by the spiral winding method using at least two offset segments each in the form of a continuous strip, the width relationship of the two segments is n:1, in which n is 1, or an integer.

The use of two strip segments, particularly segments with their jointing structures located in offset edges, overcomes in an elegantly simple fashion one of the chief difficulties with the spiral method as no special steps have to be taken to bond the strip edges together to ensure lateral strength and stability in the two layer fabric, and there are no problems with any unevenness in the strip edge area as a result of using special methods for jointing the strip segment edges together. Due to the presence of two layers in the fabric, some minor imperfections of edge alignment between successive turns in the spiral can be tolerated. However, the edges of successive turns should be kept in as close register with each other as is possible.

When two, or more, segments in the form of strips are used, the physical properties of each segment need not be the same, and can be focussed on different requirements, such as wearing properties, and structural strength.

Alternatively, for segments in the form of panels, it is preferred that the segments be assembled in a piecewise fashion so that the jointing structures on the separate segments are interlocked sequentially to form the necessary joints.

If the chosen integral jointing structure is a slot-and-rib type complementary mating structure, it can be obtained either by using specially shaped yarns, or by forming the two parts of the structure directly in a nonwoven segment. Specially shaped yarns are woven into each segment as either warp or weft. At least four arrangements of these slot-and-rib integral jointing structures are possible.

In the first arrangement, two different segments are made, so that one segment includes slots, and the other segment includes ribs. The number and placement of the slots in one segment, and of ribs in the other segment are preferably the same, so that equal numbers of ribs and slots are used in the joint.

In the second arrangement, only one type of segment is made, and both slots and ribs are provided in the segment. Because the ribs and slots of each segment are provided in the same sequence, all segments are thus identical and the planar surface of a first segment can be attached to the equivalent planar surface of a second segment as in the first method. The segments are positioned so that sufficient pairs of slots and ribs are interlocked to provide a secure joint.

In the third arrangement, which appears to be only applicable to woven segments, an offset weaving process is used in which one ply of a two-ply segment is woven so that it is offset to one side, and the second ply is woven so that it is offset by an equal amount to the opposite side. The lateral jointing area of each ply may contain either slots, or ribs, or both slots and ribs. Adjacent segments can be interlocked at their edges to produce a fabric with no dimensional discontinuities. In this special case, the central part of the segment is woven in a single step, and the two plies are interconnected by tie strands interwoven between each of the plies.

In the fourth arrangement what is effectively a variation of offset weaving is used. A sequence of ribs and slots is woven across the full width of one face of each ply. The two plies are simultaneously woven with the desired offset in the loom. The offset plies are interlocked as they are woven, by passing the two plies through a roller nip at the loom take-up roll which forces the slot and rib yarns into engagement to form a two ply segment, with two laterally exposed jointing areas.

The on-loom attachment of the plies to each other in the segment can be further enhanced by means of so-called "tie strands", which interlace both plies and aid in holding them together. This serves to pull the plies together, and will facilitate the engagement of the slot-and-rib yarns from both plies. In-plane movement of the individual segments within the assembled fabric is also minimized due to the strong and positive attachment at the jointed surfaces, thereby further reducing possible defects in the assembled fabric.

It is preferred that slot-and-rib yarns are woven in the warp direction. If woven in the weft direction, special weft insertion equipment will be required to prevent the weft yarns from twisting about their longitudinal axes. The orientation of the slot yarns must be controlled during weaving so that the slot is always presented to the jointing surface of the segment. One way to accomplish this is to make at least one surface of the strand containing the slot or rib flat, or nearly flat. This serves to define the orientation of the slot during the weaving process and thus its orientation in the segment after weaving.

It is necessary that the rib yarn is the right size to engage and to interlock securely with the slot yarn. It is also possible to use a hollow rib yarn for engagement with the slot yarns, so that it can be deformed during interlocking. This can be beneficial in that, as the rib strand is interlaced and traverses the planar surface of the woven segment used for attachment, the yarn can be oriented to be relatively narrow in the plane of the jointing surface of the segment. When it engages with a slot yarn it does not unduly distend the sides of the engaging slot. However, once it is meshed into the slot, it can be deformed thus creating a positive interlock.

To effect such a positive interlocking, the rib-and-slot yarns must stand proud of the planar surfaces to be joined. It is desirable to use a relatively long float of the rib and slot yarns at the surfaces to be joined, so that maximum continuous interlocking can be achieved. The length of the float, and consequently the weave design of the segment, must be balanced with the other properties required in the assembled fabric.

If the chosen integral jointing structure of the segments is a discontinuous one, such as hook-and-loop and mushroom type complementary mating materials, in which the hooks and loops may be yarns, then these materials are incorporated into the segment as a ply, or part of a ply. It is possible to weave a region containing a hook and loop structure along one edge, or both edges, of a woven ply, and to weave a hook and loop structure into a ply such that the hooks are located in one planar surface, and the loops are located in the other. In a multi-layer fabric the plies can be offset to one another, and the hooks and loops are interlocked in the central portions.

Where the segments are nonwoven, there is a similar level of flexibility. The chosen jointing structures are incorporated into the desired locations on the plies during manufacture, and then interlocked.

In certain instances it is possible to use a discontinuous jointing structure interlocked with a continuous one, for example a combination of a slot with a row of mushroom shapes.

In the descriptions that follow, the concepts described for the sake of clarity in the context of a woven fabric incorporating specially shaped yarns are equally applicable to nonwoven fabrics in which the jointing structures are formed as a part of the nonwoven fabric. A woven fabric hook-and-loop structure has effectively the same jointing properties a nonwoven fabric including integrally formed hook-and-loop structures.

In addition to providing a secure joint, these hook and loop materials provide a fabric which in the two layer joint between plies includes a proportion of yarns more or less permanently oriented perpendicularly to the plane of the fabric. This has the unexpected result that more or less in the middle of the fabric there is a region with significant void volume. These perpendicular yarns tend to resist the compaction of this void volume, which is a significant advantage for example in a base fabric for a press felt in a papermaking machine. The presence of the central void volume will aid in extracting water from the wet paper web.

There are several arrangements of hook and loop materials that can be used.

In a first arrangement, a layer of hook material is interlocked with at least one layer of loop material. The nature and inherent strength of the joint is determined by the parameters chosen for the hooks and the loops, and by the interlocked area of the joint.

In a second arrangement, a layer of hook material is interlocked with at least one layer of hook material, and all of the segments are then the same. For a woven ply this arrangement has the disadvantage that a hook-to-hook joint is not as mechanically strong as a hook-to-loop joint. The strength of a hook-to-hook joint for both a woven and a nonwoven ply can be improved by including a thin layer of batt between the layers of hook material, and through which the hooks of each layer of hook material are interlocked.

In a third arrangement, two layers of hook-and-loop material are interlocked, each of which includes hooks and loops. This arrangement has the advantages that all of the segments are the same, and a reasonably strong joint is obtained.

The spiral winding method of interconnecting two fabric strip segments offers several advantages. As the fabric is built up, lap type joints are formed between the jointing structures. By using the surfaces of the segments to form the joints, the joint mechanical strength is easily controllable, and may be increased or decreased by adjusting the size of the overlap. In the spiral winding method, almost any combination of strip widths is feasible, provided that the edges of the two strips are not located one above the other in the assembled fabric. It is preferred that the widths of the strips be in a ratio of n:1, in which n is either 1, and the strips are of the same width, or n is an integral number. The strongest joint will be obtained when the ratio of the strip widths is 1:1, and the strips overlap each other by 50% of their width. If strips are used whose widths are such that n is not an integral multiple, then there is the possibility that the edges of the two strips will coincide, and a discontinuity will occur through the thickness of the fabric. At this discontinuity, there will be no overlap, and thus no cohesion between the strips to provide lateral strength in the fabric. This is not desirable.

When a fabric is assembled by spiral winding separate segments of either slot-and-rib or mushroom type structures, each ply in the segment will have its own neutral bending plane. In the completed fabric, the outer segment will have a slightly greater length than the inner segment. Even though there is a secure joint between the segments, the jointing structures do allow the two layers to move a little relative to each other to accommodate the effects of curvature.

This method for jointing segments together makes it possible to assemble the fabric from segments of differing properties, so as to create asymmetry through the plane of the fabric. Asymmetry through the plane of the fabric is advantageous for many reasons, for example, to manipulate the neutral plane of the assembled fabric which can then be used to minimize speed differences at the surfaces of the fabric due to its thickness when running over rolls with differing radii. The ability to define the surfaces of the assembled fabric by means of asymmetry through the plane of the fabric is beneficial in providing contact area differences between the outer surfaces and surface contour differences which can be useful for managing boundary layer air in moving fabrics.

By means of this invention, it is now possible to alter easily the fabric segments independently of each other, so that one outer surface can be optimized for one property and the other outer surface optimized for a different property. Further, the outermost plies of the segments need not be those involved in making the segment to segment joints. For example, by using different materials, abrasion resistance could be optimized for one surface and contamination resistance the other. Many alternatives are thus possible within the scope of this invention.

By adjusting the inner surface area of each ply, the strength of the joint can now be adjusted. Also, by keeping the surface area of the joint constant but adjusting the density of the jointing structures, such as hook-and-loop or slot-and-rib, the strength of the joint can be adjusted. Since the jointing structures are incorporated into the segments, their placement can be precisely controlled thus making the attachment to the adjacent segments accurate and easily accomplished. The precise placement of the jointing structures into each segment also reduces defects in the assembled fabric.

For some applications it is desirable to make the interlocked joint between the jointing structures more secure. When slot and rib structures are used an adhesive may be placed in the slots. If an adhesive is used, its application into the slots protects it during manufacture, whilst making it available to provide adhesion in the joint when the two jointing structures are interlocked. In some cases it is possible to use a chemically reactive system instead of an adhesive, such as a polyurethane: the reactive material itself bonds the jointing structures together to form a bond whose strength is equal to, or closely approaches, the strength of the material used in the rib and slot structures. Alternatively, it is sometimes possible to insert a layer of nonwoven material between the plies, such as a thin layer of fibrous batt between hook and loop, or hook and hook, structures, or a web of hot melt adhesive.

By having the opportunity to assemble panels which have defined length and width, a different level of flexibility is achieved in the manufacturing process when compared to a strip or strips.

Because the integral joints are precisely located in the plies of individual segments, it is now possible to provide an assembled fabric which can be finally joined on the machine for which it is designed. For example, to form a closed loop, the final joint or joints are the same as all of the others between the segments.

By using the two layer overlapped joints of adjacent segments as the means of closure, in which the joint is substantially in the plane of the fabric, it is now possible to make that closure in such a way as to make its orientation with respect to the body of the fabric an optimum for the specific performance required. As an example, the closure in a paper machine press felt would not need to be in the cross machine direction, i.e. perpendicular to the running direction of the felt. This would remove the closure as a source of vibration or bounce in the press section.

A further advantage inherent in this invention arises when a rib and slot structure is used as the jointing structure. Almost any pair of mating structures in which one element is inserted into the other can be used, ranging from a simple rounded rib fitting into a simple groove-like slot, to complex structures such as dovetail shapes, in which both the rib and the slot include a wedge shape, and shapes including one or more barbs. The choice of the cooperating shapes for the rib and the slot is determined by the ability to fabricate them reliably in the desired locations, by the strength required in the assembled joint, and by the ability to assemble, and, if required, to disassemble the joint.

For applications in which either continuous or discontinuous jointing structures are used and which will only be separated when the whole fabric is replaced damage to the structures on separation is immaterial. On the other hand, if it is required to be able to open and to reclose the joint, or to be able to replace a part of the fabric, then jointing structure damage on opening the joint is not acceptable.

This invention also provides a solution to one problem associated with extended nip press belts, also known as press blankets. These belts are required to have a smooth inside surface, which is obtained by applying a grinding process to the inside face of the belt prior to use. This grinding step is complicated by the fact that these belts are often impregnated with, or encased in, a polyurethane material, which is intended to make the belt impervious to roll lubricating oil. The presence of the coating makes it effectively impossible to turn the belt inside out for grinding. Typical examples of this type of belt are described by Stigberg, in U.S. Pat. No. 5,171,389 and in U.S. Pat. No. 5,196,092; by Dutt in U.S. Pat. No. 5,238,537; by Schon in U.S. Pat. No. 5,132,141; by Jermo in U.S. Pat. No. 5,525,194; by Watanabe et al in CA 2,065,903; and by Matuschczyk in CA 2,068,800. By using the fabrics of this invention it is possible to assemble such belts from segments that are ground to exact dimensions before assembly.

This invention also makes it possible to make fabrics in which one side has a predetermined pattern such as grooves or other surface structures. For example, a fabric with mushroom type fasteners can be attached to a perforated roll, and a ribbed fabric can be located onto a slotted roll surface. These fabrics facilitate roll maintenance because the old cover can be removed and a new cover installed without dismounting the roll.

BRIEF DESCRIPTION OF THE DRAWINGS

The invention will now be described by way of reference to the drawings in which.

DETAILED DESCRIPTION OF THE DRAWINGS

Figure 18:
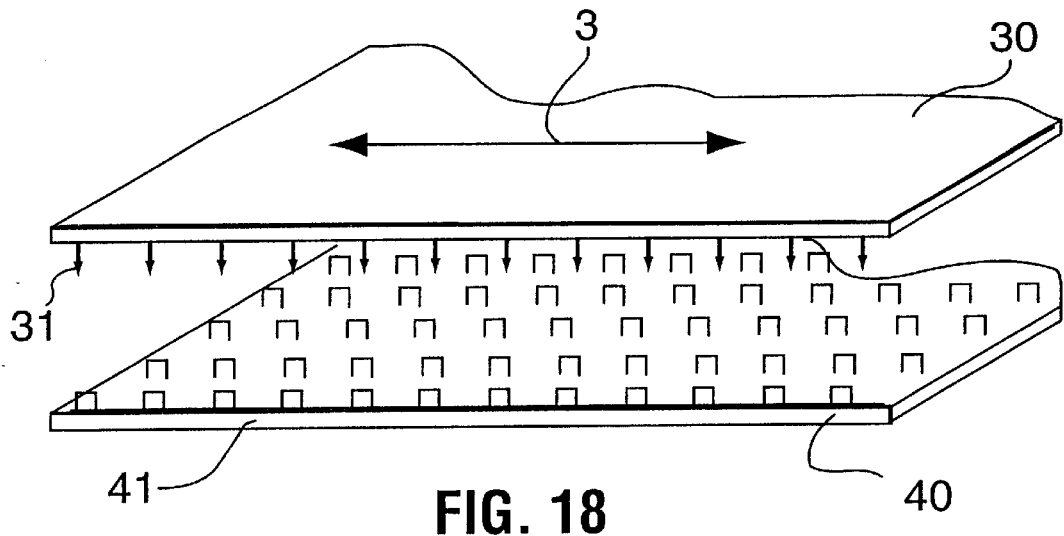
FIGS. 18 and 19 illustrate hook-and-loop and hook-and-hook yarns as the integral jointing structures.
Figure 19:
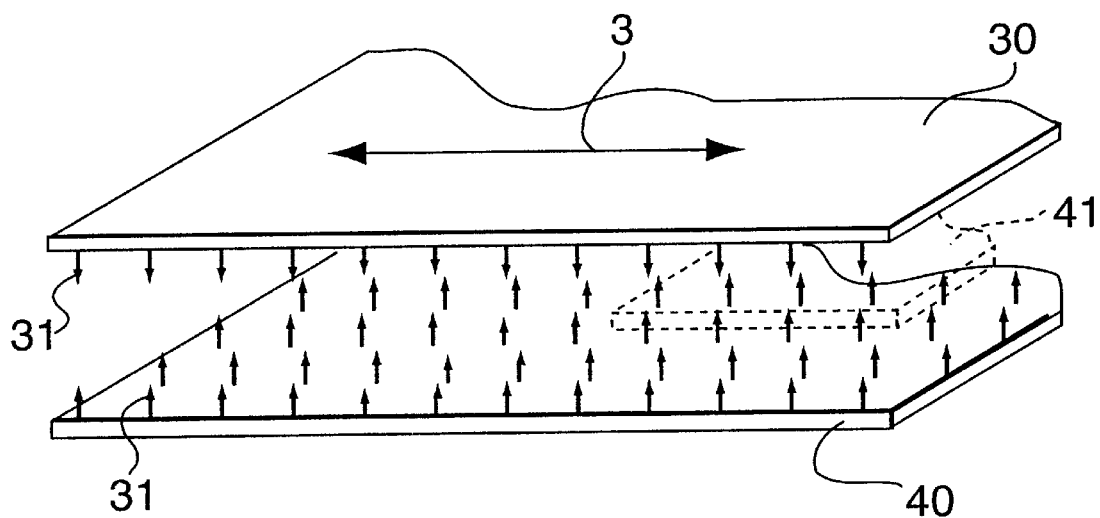

In the Figures the symbol ▲ represents a rib structure, the symbol ■ represents a slot structure, and the symbol ● represents an ordinary yarn. In FIGS. 18 and 19 the symbol ∩ represents a loop, and the symbol ○ represents a hook.

Figure 1:
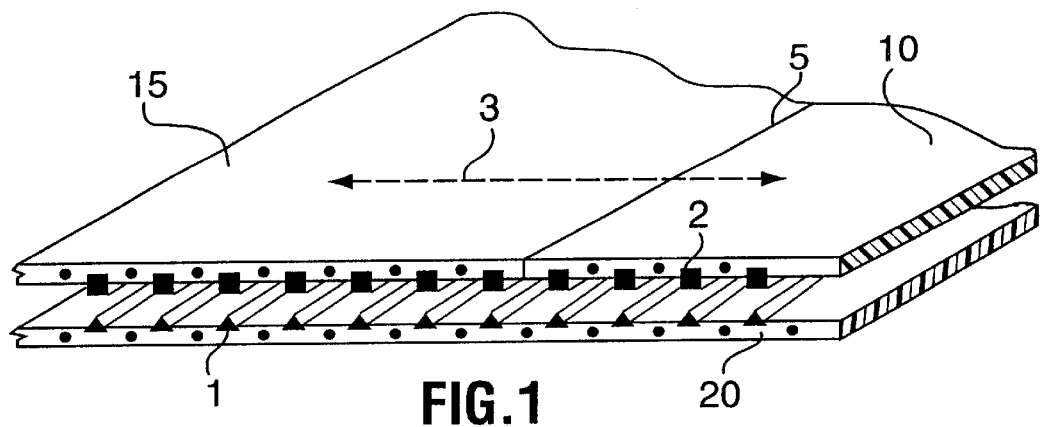
FIGS. 1, 2 and 3 illustrate multi-ply fabric structures including three different arrangements of slot-and-rib jointing structures.

FIG. 1 shows schematically a cross section in the direction 3 of three segments 10, 15 and 20, into which slot structures 1 and rib structures 2, generally designated as "S" and "R" hereafter, are the jointing structures; these may be either woven or nonwoven plies. If any of 10, 15, and 20 are woven structures, the S and/or R structures are incorporated during the weaving process, and the ply is woven according to a weave design which provides for long exposed floats of the yarns including the R and S structures, to facilitate their engagement and interlocking. In the area of the fabric shown (see also FIG. 2) all three segments are involved in the joint. Segments 10 and 15 are not jointed to each other, but rather abut each other closely along the line 5. However both of segments 10 and 15 are jointed to the segment 20, which overlaps the joint line 5 between segments 10 and 15.

In this embodiment, all of the jointing structures 1 in segments 10 and 15 are S, and all of the jointing structures 2 in segment 20 are R yarns. As FIG. 1 shows, if woven plies are used, it is not necessary that all of the yarns of the segments to be joined be R and S yarns. The invention may also be practiced by incorporating two, three, or more ordinary yarns in between R or S yarns: the spacing required for the R and S yarns is determined by the properties desired in the assembled fabric. For a woven ply, the size, type (e.g. monofilament, spun yarn, braided yarn etc), and composition of the ordinary yarns, and the composition of the R and S yarns, are also determined by the properties of the assembled fabric.

To assemble the finished fabric, the segments are brought into alignment so that the S structures in segments 10 and 15 are brought into engagement with the R structures in segment 20. The two segments are then interlocked by pressing the ribs into the slots, thereby forming the desired joints. For woven plies, if the direction 3 corresponds to the wefts, and the R and S yarns are therefore both warp yarns, the interlocking of the segments 10 and 15 with segment 20 is conveniently obtained by passing the engaged segments through a roll nip. Alternatively the segments 10 and 20 may be pressed into engagement and interlocked by hand or by any suitable pressure means.

Figure 2:
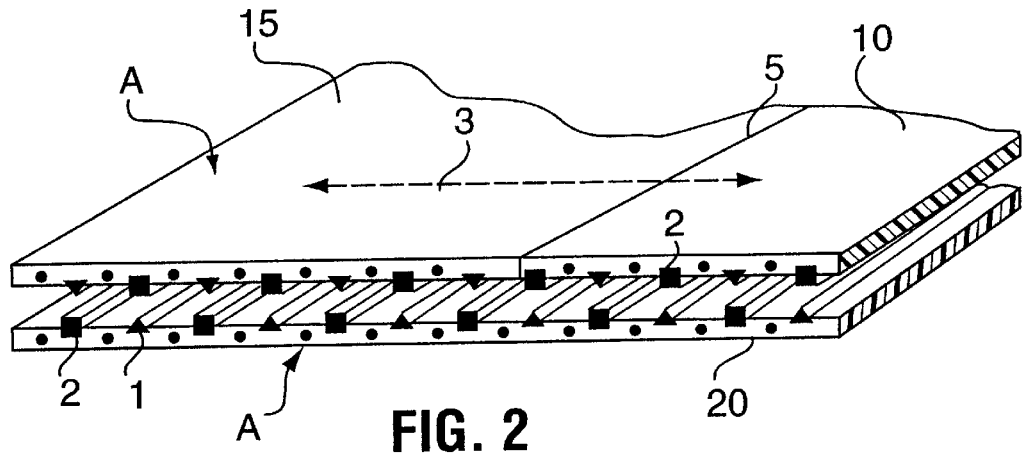

In FIG. 2 the R and S structures alternate, and segments 10, 15 and 20 have the same pattern. Since one segment must be inverted relative to the other to form a joint—the two sides marked as A will have been on the same side during segment construction—the pattern in the inverted segment becomes a mirror image of the other, and the three segments can be interlocked. The segments 10 and 15 are again in a closely abutting relationship along the joint line 5.

It is not necessary that the R and S structures 1 and 2 extend for the full width of the segment. For some applications the R and S structures need only be provided in the lateral margins of the fabric segments, as is illustrated schematically in FIG. 3, where the area 4 does not contain any jointing structures. Consequently, in the area 4 the two plies are not connected together at all. This arrangement is suitable for constructing both a two layer fabric in which each segment is of the same size as the fabric, and a two layer ply. This arrangement is also suitable in instances where a batt is attached to the fabric, and the needling process will provide sufficient attachment between the fabric segments remote from the two layers in the joint area.

Figure 3:
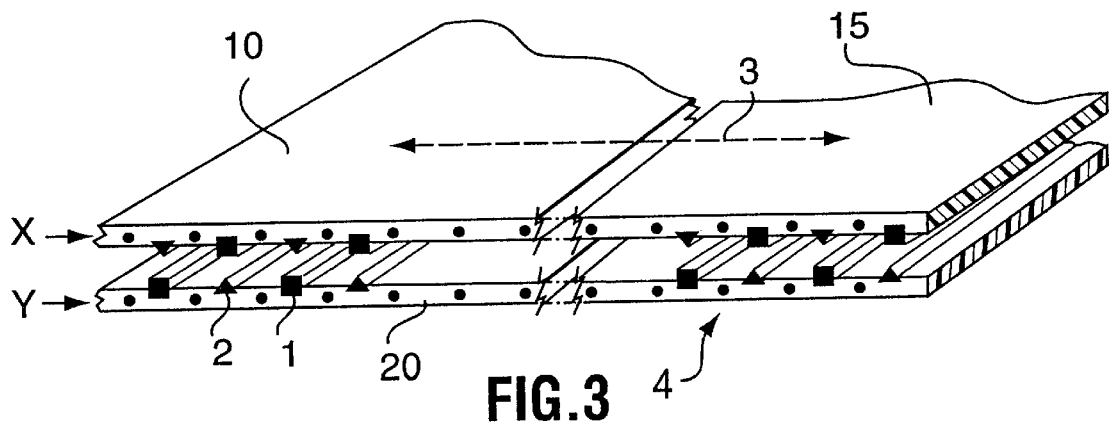
Figure 4:
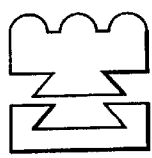
FIGS. 4 through 15 are cross sectional illustrations of various slot-and-rib combinations.
Figure 5:
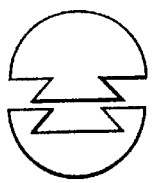
Figure 6:
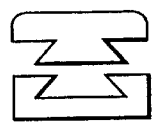
Figure 7:
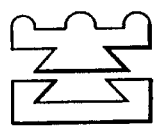

When the segments shown in FIG. 3 are assembled into a fabric it is not necessary that the two ply faces be engaged as shown, with the edges X and Y in registration. The segment 10 can be offset relative to the segment 20, so that the edges X and Y are not in registration. If the construction used in FIG. 3 is offset, the widths of the two jointing areas at each edge of the segment will generally not be the same, but the pattern of R and S structures in the two segments can continue to be the same.

Figure 21:
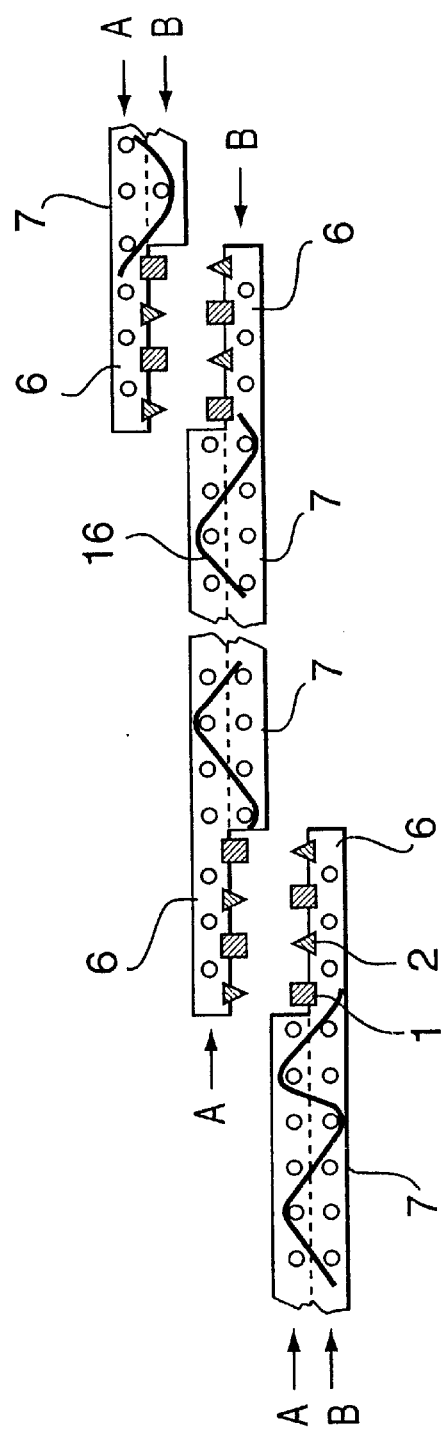
FIG. 21 illustrates offset weaving with the addition of tie strands to further secure the fabric plies together.

Yet another alternative is shown in the cross section in FIG. 21. In applications where it is not necessary that the joint extend over the full face area of the ply or segment an offset construction can be used, for example by using offset weaving of two plies A and B in a single segment. The S and R structures 1 and 2 are only provided in the relatively thinner offset regions 6, so that when the fabric is assembled it has a constant thickness. In the inner area 7 the two parts A and B of the two ply weave are joined together by ties or binder yarns, as at 16. As shown, the segment has a flattened Z section; it can also be made as a flattened T section, in which case alternate segments are inverted on assembly.

There are a great many possible combinations of R and S structures which may be used in forming the joints between segments. A selection of some of the possible shapes are shown in the cross-sections of FIGS. 4 through 15, and in FIG. 22. In these Figures, for clarity, these structures are shown as yarn cross sections. With the exception of FIG. 8, which is discussed below, the remainder can all be made as part of a nonwoven sheet material, for example by well known plastic extrusion methods. It is also contemplated that combinations may be made in which one of the R and S structures is a yarn, and the other is not.

Figure 8:
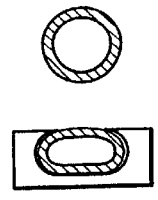
Figure 9:
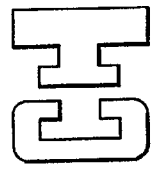
Figure 10:
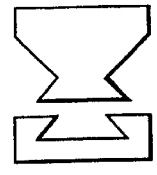
Figure 11:
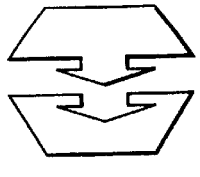
Figure 12:
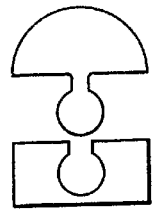
Figure 13:
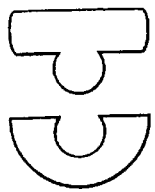
Figure 14:
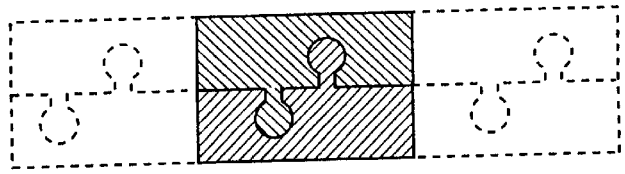
Figure 15:
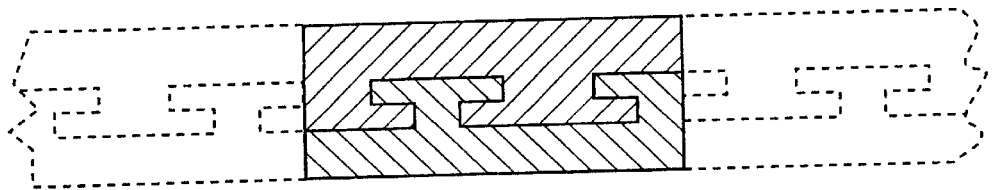

There appear to be only two limitations on the shapes of these structures: the ability to create each member of the pair (by extrusion or other suitable forming process) of suitable dimensions in a suitable plastic material; and the ability to engage and to interlock them to form a fabric. When these structures are used in the form of a monofilament yarn there is a third limitation: the ability to incorporate the yarn into a woven ply with the yarn correctly oriented. In all of these Figures, except perhaps FIGS. 8, 14 and 15, the upper section is the R structure, and the lower section is the S structure. In FIG. 8 the R structure is a deformable hollow yarn rather than one with a protruding shaped rib, which is deformed upon interlocking into the slot in the S structure, which need not be another yarn. In FIGS. 14 and 15 each of the structures include both a slot and a rib; as shown ghosted, these structures can be easily extended laterally into the form of a ribbon or sheet.

Figure 27:
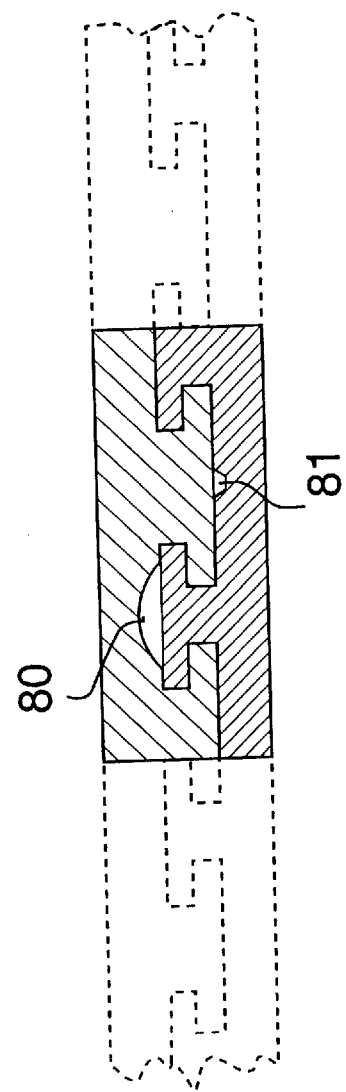
FIG. 27 illustrates a slot-and-rib combination including a channel for an insert.
Figure 16:
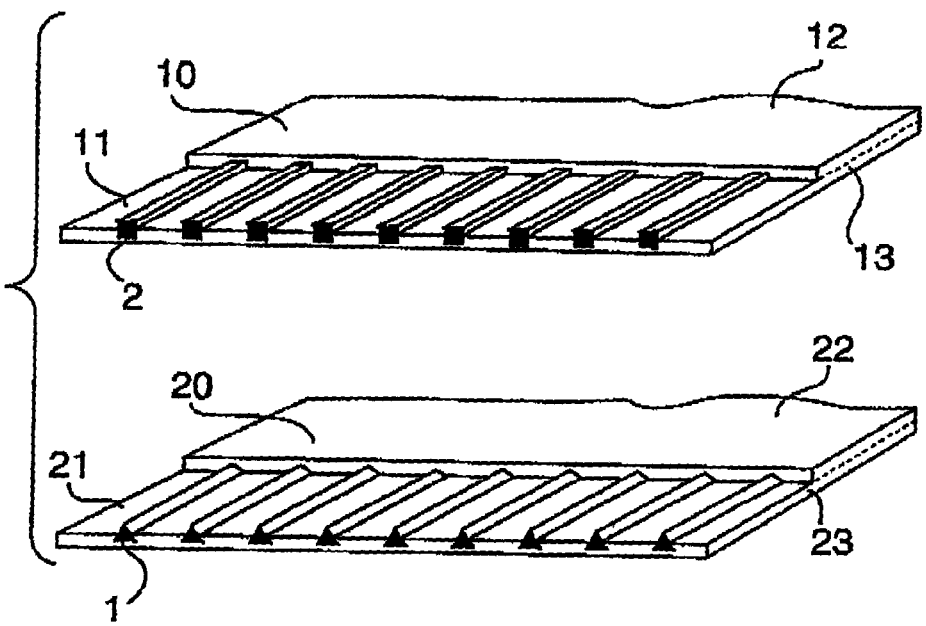
Figure 17:
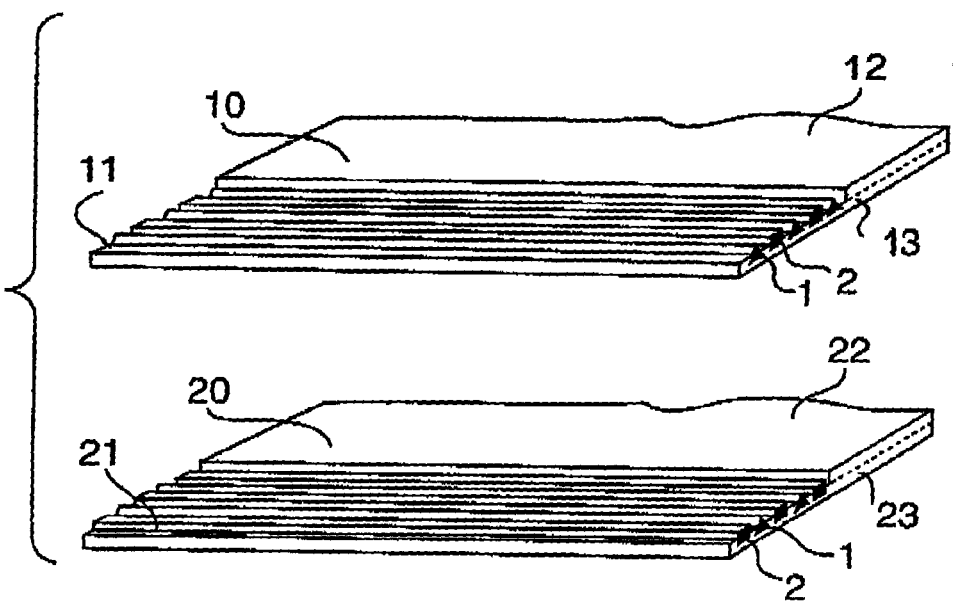

The major mechanical requirement of any these shaped structures is that they provide secure and positive interlocking. This is done by ensuring that the rib is a secure fit into the slot, and for many of these shapes the rib is conveniently somewhat larger in cross section than the slot into which it is interlocked. It is also possible to provide some free space in a slot-and-rib combination, as shown in FIG. 27. The free spaces 80, 81 can be used for several purposes: space 80 can contain an adhesive, or a chemically reactive system, and space 81 is suitable for a reinforcing fibre. These spaces can also be left empty to provide a channel for fluid flow laterally within the finished fabric or to provide some resiliency in the fabric.

Figure 16:
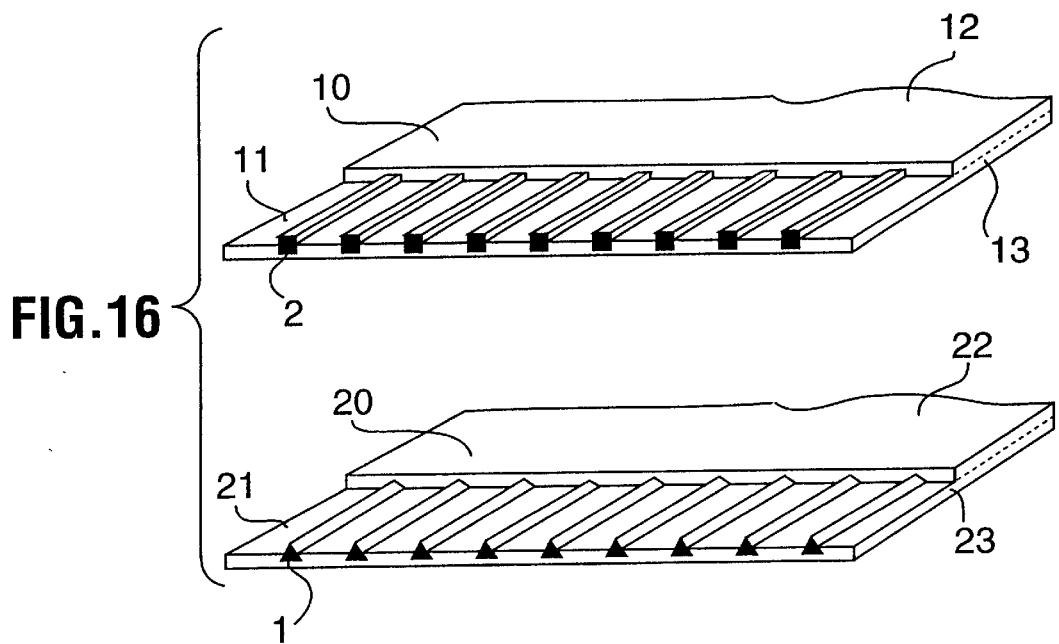
FIGS. 16 and 17 depict two seam constructions using the slotand-rib jointing structures.
Figure 17:
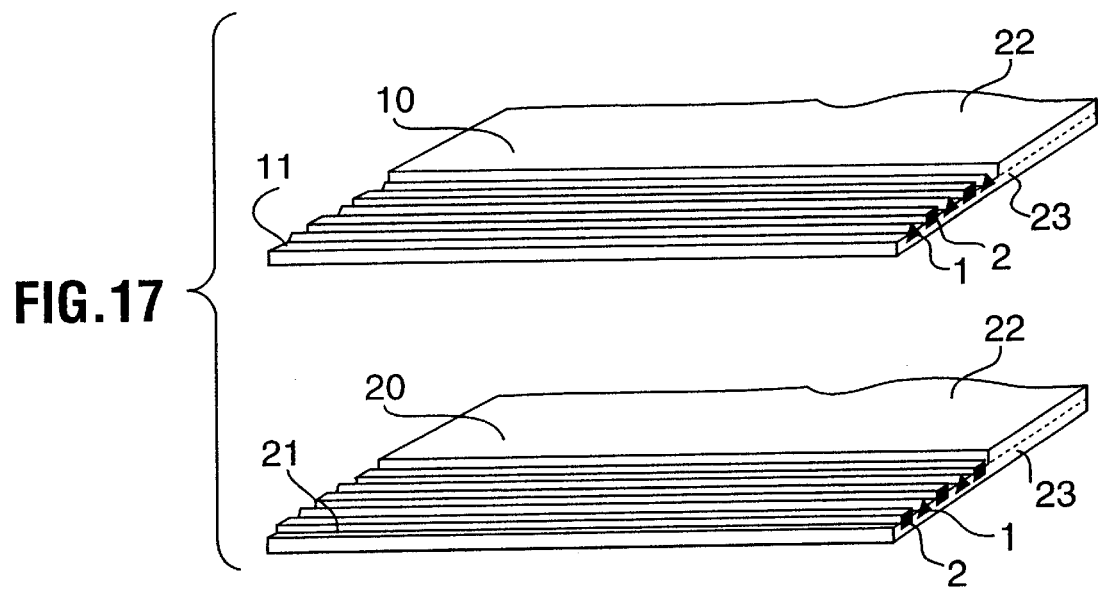

A key feature of this invention concerns the jointing of the segments by means of a lap type joint, using at least a part of the planar surfaces of adjacent segments. Such a joint is illustrated in FIGS. 16 and 17, which show two woven plies incorporating two different arrangements of R and S yarns: fabric segments 10 and 20 are jointed together by overlapping the regions 11 and 21. Each of the segments may be composed of two plies as at 12 and 13 in segment 10, and at 22 and 23 in segment 20. In this form of construction it is preferred that each segment is a composite fabric, in which the two woven structures comprising the two plies are offset to provide the jointing areas. To assemble the fabric, the R and S yarns 1 and 2 woven into the regions 11 and 21 are brought into engagement, and then pressed to interlock them. The same principles also apply to formed structures.

The difference between FIGS. 16 and 17 is the orientation of the R and S yarns. In FIG. 16, the R and S yarns are oriented along the length of the segment; in a composite fabric they would be warp yarns; in an assembled fabric which is used as a moving continuous loop, such as a papermaking machine dryer fabric, these warp yarns are usually arranged parallel to the direction of movement, or machine direction, of the fabric. With this orientation the resulting joint will be relatively weak, and will not withstand significant tensile stress across the joint. Such a joint is therefore only suitable for relatively low stress applications.

The cohesion of such a joint can be improved by placing an adhesive or reactive system in the S structures, as discussed above in the context of FIG. 28.

In FIG. 17 the R and S yarns are oriented across the length of the segment; in a composite fabric they would be weft yarns, and be oriented in the cross machine direction in a moving continuous loop fabric. This provides a considerably stronger joint, and the cohesion of this joint also can be easily increased by application of a suitable adhesive or reactive system in the slots of the slot-type yarns prior to engaging the rib yarns.

In FIGS. 18 and 19 there are shown cross sections along the direction 33 of two segments 30 and 40 in which a hook-andloop arrangement is used to provide the integral jointing structures. Methods of weaving both hook, loop, and mixed hook and loop fabrics are well known (see, for example, Brabander, U.S. Pat. No. 3,943,981; Higashinaka, U.S. Pat. No. 5,369,852; and Okawa, U.S. Pat. No. 5,369,853). It is also known to make the same structures as plastic extrusions. In the construction of these materials it is possible to control the relative lengths of both hooks and loops, the density of hooks and loops in unit area of the ply joint area, and to provide hooks, loops, or a mixture of hooks and loops in the finished ply. The manner in which these choices are made largely determines the properties of the joint made when the plies are interlocked. When the two segments 30 and 40 are pressed together, the hooks and loops interlock to hold the material securely. As is well known in this art, both of plies 30 and 40 can be the same, and include both hooks and loops. Two jointing areas which include collectively both hooks and loops provide the best joint; the use of mixed hooks and loops in both jointing areas has the advantage that the segments can all be the same. In FIG. 18 ply 30 includes only hooks as at 31, and ply 40 the includes only loops, as at 41.

It is also possible to obtain segments that are all the same by using only hooks in the jointing area, as is shown in FIG. 19. The degree of adhesion obtained with a hooks only joint is lower than with a combination of hooks and loops, and consequently such a joint is only suitable for relatively low stress applications. The cohesion of such a joint can be improved, by inserting a thin layer of batt, as shown ghosted at 41, in between the two hook areas before pressing them together. In contrast, in a nonwoven segment including mushroom type jointing structures, the resulting joint usually has more strength than a hook-and-loop one even though all the discontinuous jointing structures are the same.

Figure 20:
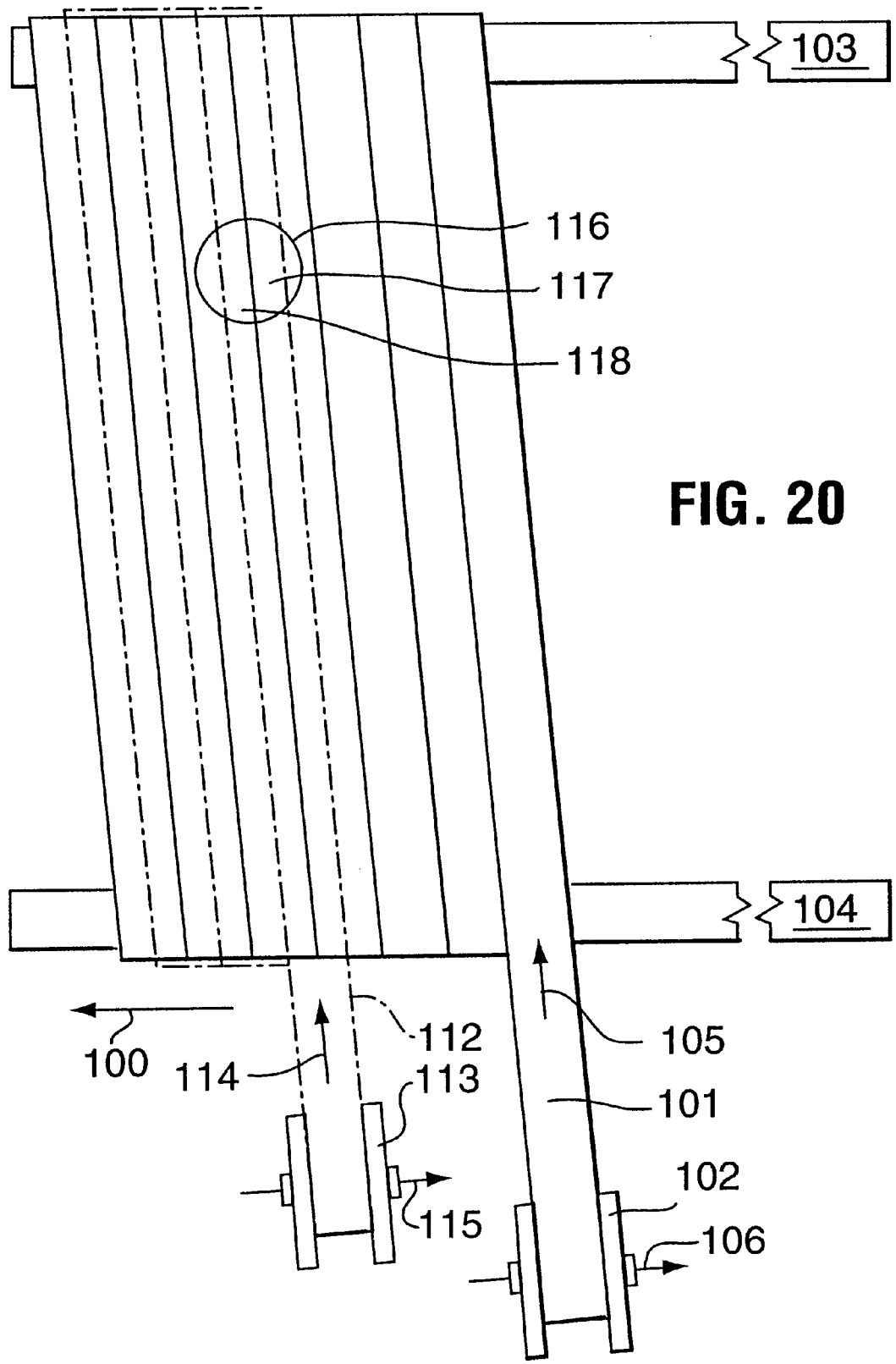
FIG. 20 illustrates fabric assembly of strip segments by the spiral winding process.

It has been noted above that the fabrics can be assembled by a modified form of the spiral winding method. This is shown in FIG. 20. In the original spiral winding method, as described in U.S. Pat. No. 5,268,076 and U.S. Pat. No. 5,360,656, a strip of fabric 101 from a reel 102 is wound under some tension and at a small angle around a pair of rollers 103 and 104. The rollers are so spaced that the resulting fabric is of the desired circumference to fit the location for which it is being made, such as the press section of a papermaking machine; if required, more than two rollers can be used. Due to the fact that the fabric strip is at a small angle to the rollers, the strip is wound in a spiral. As described in U.S. Pat. No. 5,268,076, the location of the fabric reel 102 is fixed, and the spiral of fabric built up on the rollers is moved sideways along the rollers, in the direction 100 as it is formed. This method can be improved by moving the reel rather than the spiral turns on the rollers: as the fabric strip unwinds in the direction of the arrow 105 the reel 102 is moved sideways in the direction of the arrow 106. In each case, the spiral turns are arranged in a closely abutting relationship.

One difficulty with this method is the linear edge joint between successive turns of fabric in the wound spiral. If the successive turns of the spiral are to have any lateral cohesion this joint must be as complete and as robust as is possible.

Further, the manner of creation of this edge to edge joint must not be such as to introduce disconformities into the spiral fabric. For example, this method is recommended for making the base fabric for a papermaking machine press felt: any disconformity in this edge-to-edge joint will likely result in different water removal characteristics in the joint area, which will cause an unacceptable level of marking of the wet paper web in the press section. The creation of this edge-to-edge joint between the adjacent edges of the successive spiral turns is a major problem with the spiral winding method.

The present invention provides an elegant and simple solution to this problem, especially for a fabric comprising at least two segments which are both strips. The first strip is wound onto the rollers more or less as described above. At the same time, the second strip segment 112, as is shown in chain line in FIG. 20, from a second reel 113 is wound at the same small angle on top of the first segment 101 around the rollers 103 and 104. As the second segment unwinds in the direction of the arrow 114 the second reel moves sideways in the direction of the arrow 115, and the second segment 112 is wound in a matching spiral on top of the first segment 101. If desired a third segment can be wound onto the spiral from another reel assembly.

As shown, the segments 101 and 112 are of the same width, and the reels 102 and 113 are arranged so that the segment 112 is offset by half of the width of segment 101. This arrangement will provide the strongest joint. Since the two segments are wound onto the rollers 103 and 104 under some tension, with the jointing structures facing each other, as the second segment 112 is wound on overlaying segment 101 the jointing structures engage and to a degree interlock with each other. For segments using hook and loop joints this level of tension is often sufficient; for rib and slot joints it may be necessary to provide a further pressure roll, for example adjacent roll 104. Further, since the two segments are laterally offset, the second segment 112, as at the area 116, engages with both of the two lateral edges 117 and 118 of the segment 101. This provides a spiral wound fabric with more than enough cohesion between the successive turns of the spiral to permit it to be handled.

If segments of differing widths are used in this modified spiral winding method, the same constraints apply to the relative widths of the fabric. If the ratio n between is other than an integral number, then there is the possibility that the overlap area will steadily decrease, until a point will arise at which the edges of the two segments do not overlap. This can only be tolerated if the fabric is so narrow that not enough turns are present in the spiral for such a discontinuity to occur in the fabric; the fabric spiral should be wound so that no discontinuity extends right through the thickness of the fabric.

The spiral winding method is also suitable for use with a single segment strip that has the jointing areas offset at its edges, as shown in FIG. 21.

Figure 22:
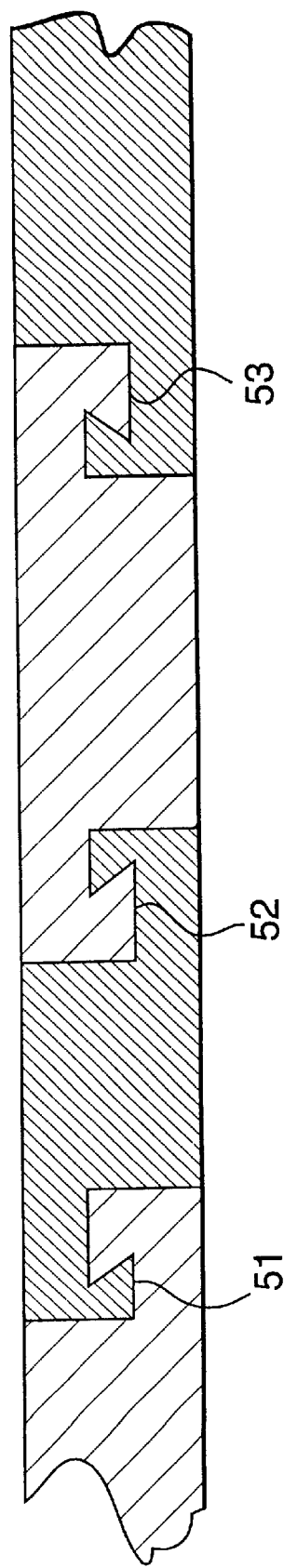
FIG. 22 illustrates a further slot-and-rib combination.

In FIG. 22 is shown a further slot-and-rib combination similar to that shown in FIGS. 4–7, in which the dovetail system is separated into two parts. One part may be inverted relative to the other as at 51 and 52, or the two parts may be the same way up, as at 52 and 53.

Figure 23:
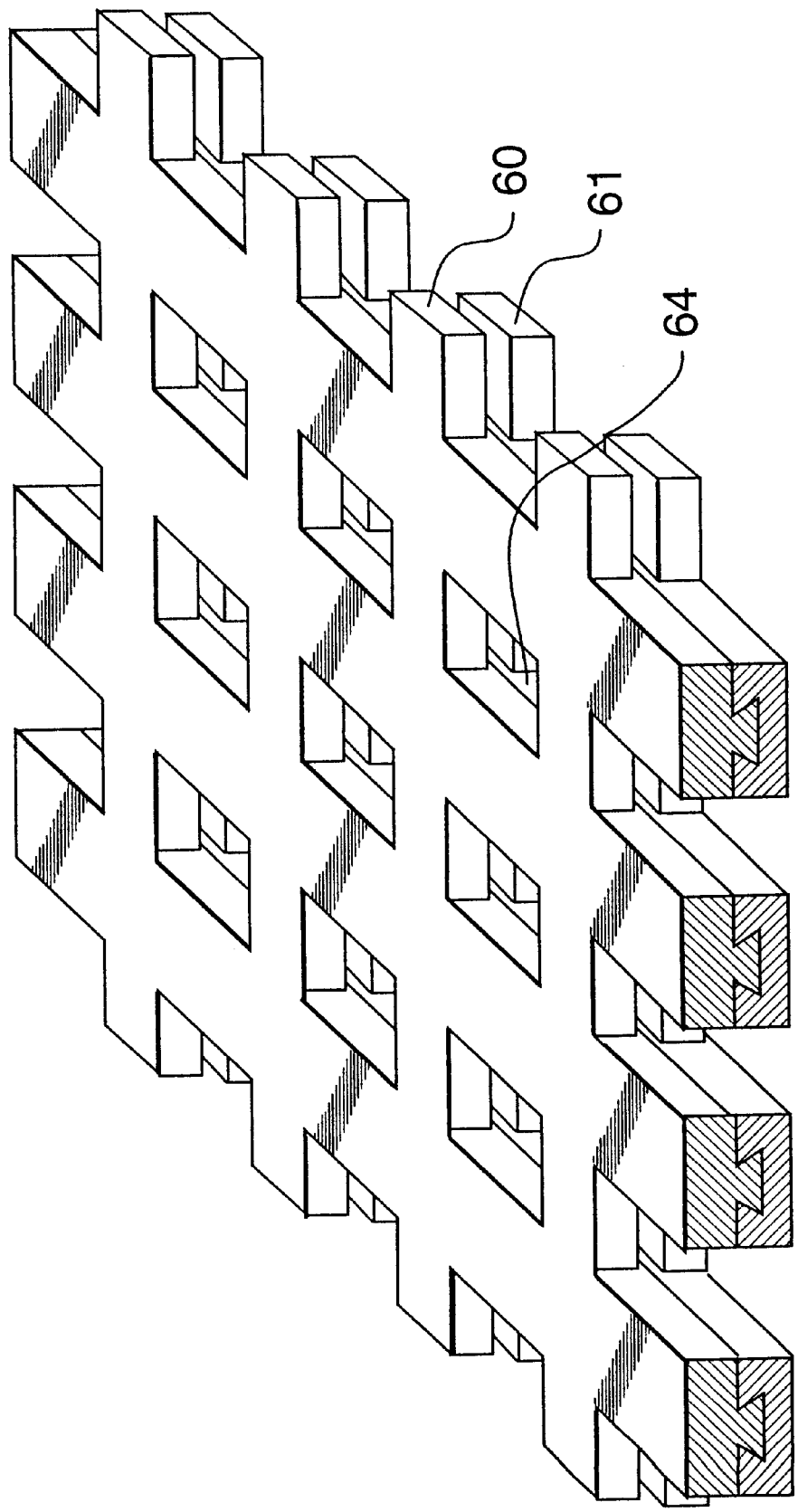
FIGS. 23 and 24 illustrate moulded plies using the slot-andrib combination of FIG. 16.
Figure 24:
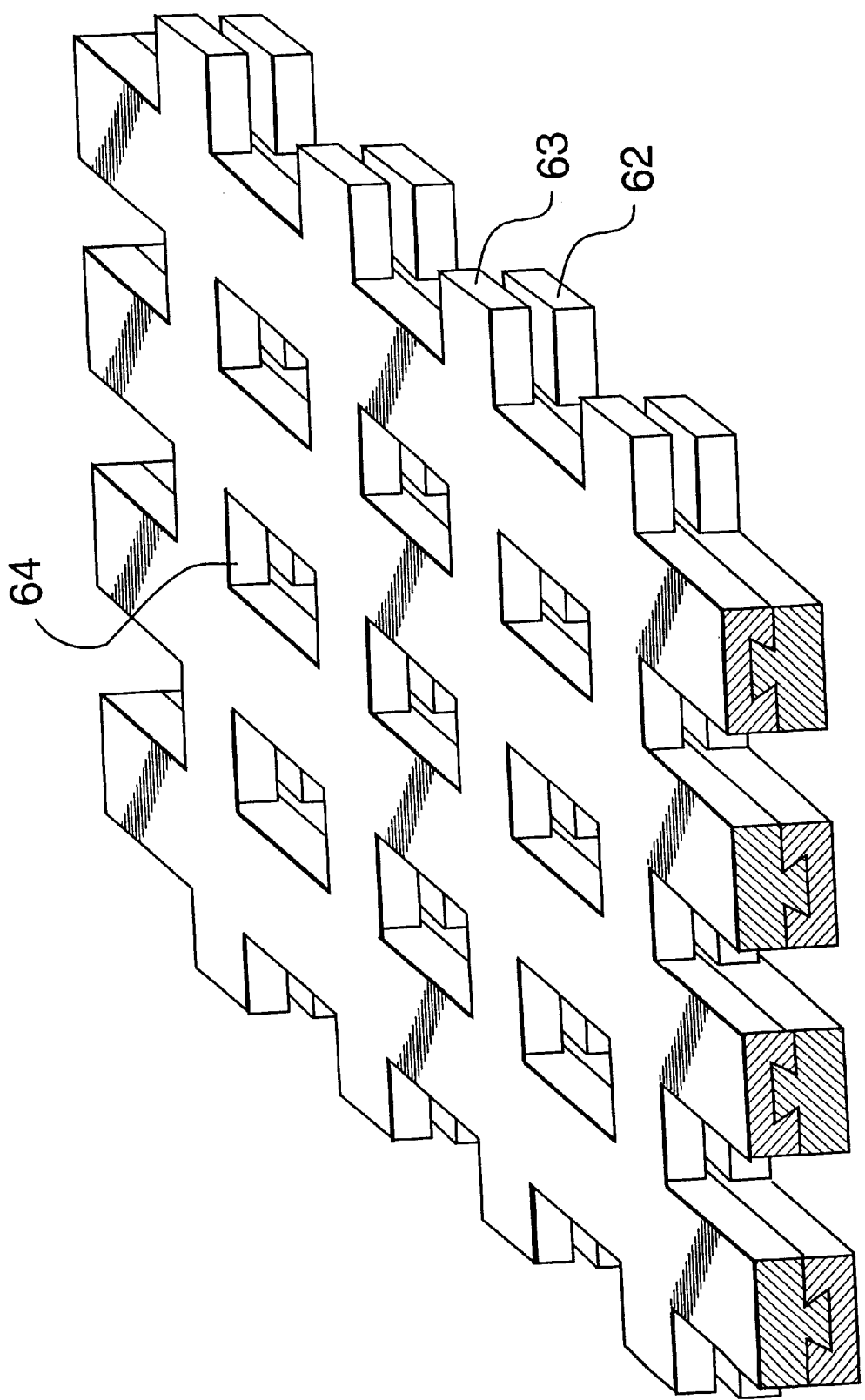
Figure 25:
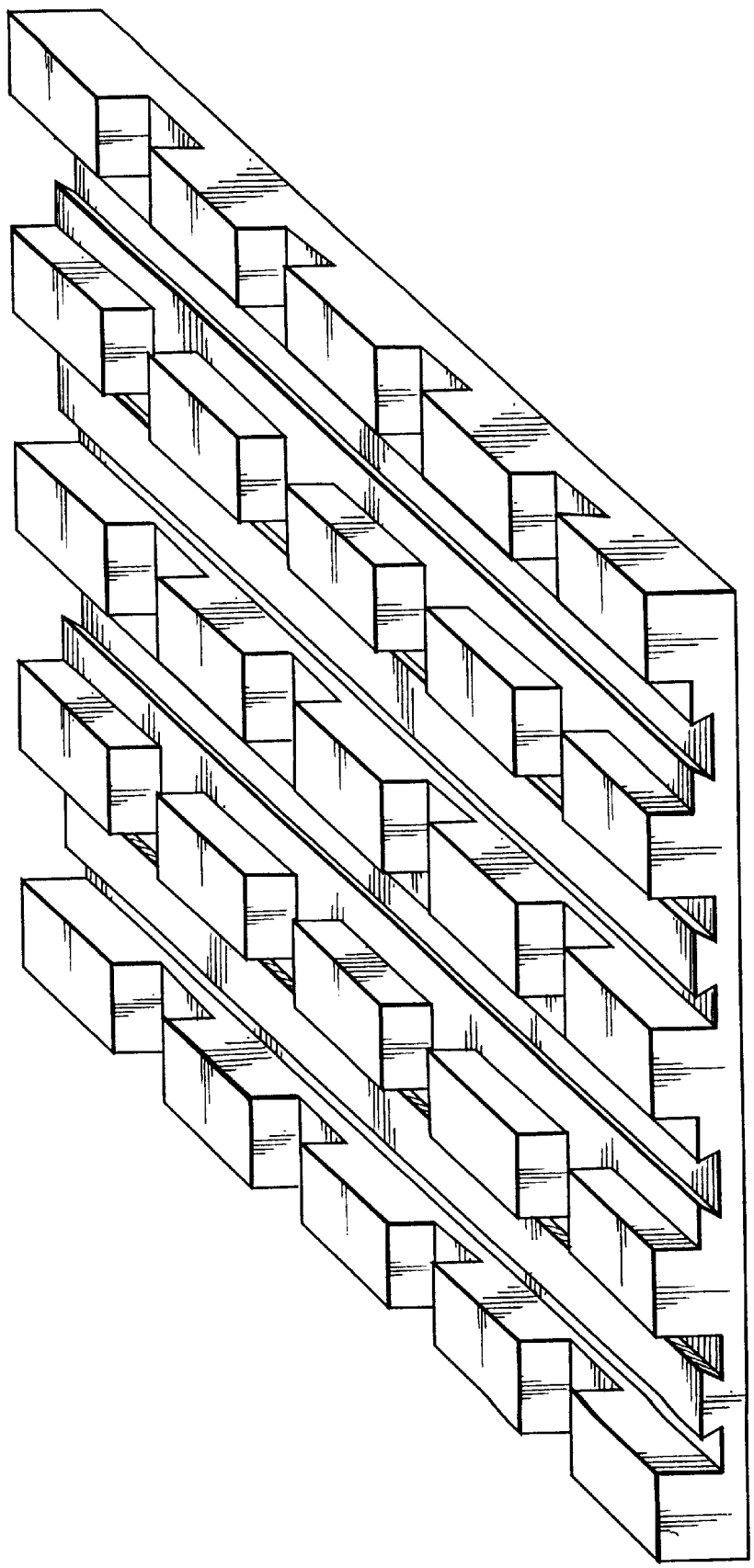
FIG. 25 illustrates a mould used to make the plies of FIG. 24.

FIG. 16 illustrates a slot-and-rib combination for a pair of yarns: the same jointing structure can be used in a moulded ply, and is illustrated in FIGS. 23 and 24. In FIG. 23 one ply 60 includes only S structures, and the other ply 61 only R structures, whereas in FIG. 24 both plies 62, 63 are the same, and include both S and R structures. These Figures also show a further feature of this invention, namely that a ply need not be continuous: the segment in these FIGS. includes spaces. FIG. 25 illustrates a mould suitable for making the plies in FIG. 24.

Figure 26:
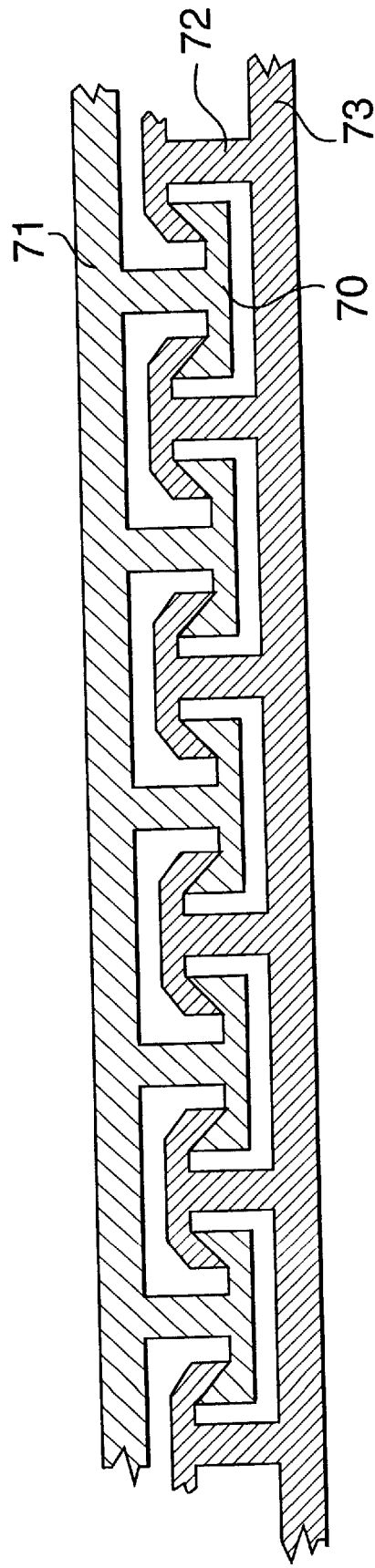
FIG. 26 illustrates a fabric including two extruded hook-andhook structures.

FIG. 26 illustrates two forms of an extruded hook-andhook structure. The double hooks 70 on ply 71 are not the same shape as the double hooks 72 on ply 73. Each shape can also be interlocked with itself.

In addition to the above noted benefits, novel properties can now be engineered into the fabric by employing differing materials in each ply. For example, it would be possible to assemble a multi-ply fabric structure from several plies each having a different porosity, some of which may even include void spaces, a feature which would be useful in filtration applications. Alternatively, one or more plies could be made impermeable, for example by using a nonwoven moulded or extruded ply, and provided with reinforcing yarns in at least the running direction, the final fabric structure being useful for transport belting or in pressing applications, such as shoe presses. An additional possibility is that by using different constructions in each of the plies, it would be possible to affect the neutral line of the fabric, which affects the flexibility of the assembled fabric. The interlocking jointing structures of the segments also provide further opportunity to develop unique mechanical properties in the fabric, such as compressive strength and interior void volume.

This lap type joint provides the fabrics of this invention with several important advantages over similar so-called modular fabrics of the prior art. Firstly, by using surfaces of the individual plies substantially in the plane of the fabric to form the joint, rather than a thin ply edge substantially vertical to the plane of the fabric, the mechanical strength of the finished fabric is easily controllable. Secondly, by overlapping adjacent segments, control of their relative placement into a closely abutting relationship is easier to accomplish, thereby providing more consistent and relatively defect free joints. Thirdly, any defects which may occur during manufacture in one ply may be at least partially hidden by the other ply used in the lap type joint, and therefore may not create an unacceptable discontinuity in the fabric. Fourthly, because the fabrics of this invention are assembled from plies and segments which can be manufactured ahead of time and will basically snap together, production and manufacturing scheduling can be reduced in complexity, and manufacturing time shortened. In addition, the machinery required to produce industrial fabric structures according to the invention need not be as large (wide) as has been required when conventional fabrics are produced as a whole unit. The fabric structures of the present invention thus represent cost savings in both capital equipment expenditures and manufacturing time.

Yet a further advantage offered by this invention relates to the installation of these fabrics onto the equipment for which they have been manufactured, such as the forming, press or dryer section of a paper machine. The method by which the segments are assembled to produce the final fabric structure may also be used to provide an on-machine seam or joint to attach the distal ends of the fabric together to render it endless, and to provide the required continuous loop. The final joint closing the loop does not have to be linear across the fabric, as is the case for example with a pin seam, or in a specific orientation in relation to the edges of the fabric structure. Such a seam is non-marking and capable of withstanding the rigours of use in the papermaking machine.

We claim:

1. An industrial fabric comprising at least one first and one second segment, each segment including at least one ply, wherein:
   (a) the or each first segment includes, in at least one face which is substantially parallel to the plane of the fabric, a first ply including first integral jointing structures incorporated into the first ply substantially parallel to the plane of the fabric at selected locations of the face of the first segment;
   (b) the or each second segment includes, in at least one face which is substantially parallel to the plane of the fabric, a second ply including second integral jointing structures incorporated into the second ply substantially parallel to the plane of the fabric at selected locations of the face of the second segment; and
   (c) the first jointing structure incorporated into the or each first ply included in the first segment and the second jointing structure included into the or each second ply included in the second segment each comprise formed structures which engage with, and interlock with, each other to provide a lap joint between the selected locations.

2. A fabric according to claim 1 comprising at least one first and one second segment, each segment including at least one ply, wherein:
   (a) the or each first segment includes, in at least one face which is substantially parallel to the plane of the fabric, a first woven ply including first integral jointing structures woven into the first ply substantially parallel to the plane of the fabric at selected locations of the face of the first segment;
   (b) the or each second segment includes, in at least one face which is substantially parallel to the plane of the fabric, a second woven ply including second integral jointing structures woven into the second ply substantially parallel to the plane of the fabric at selected locations of the face of the second segment; and
   (c) the first jointing structure woven into the or each first segment and the second jointing structure woven into the or each second segment comprise shaped yarns which engage with, and interlock with, each other to provide a lap joint between the selected locations.

3. A fabric according to claim 2 wherein each woven ply comprises at least interwoven warp and weft yarns, and the integral jointing structures are woven into the ply at the selected locations during the weaving process as a portion of either the warp or the weft yarns.

4. A fabric according to claim 3 wherein the integral jointing structures comprise a portion of the warp yarns.

5. A fabric according to claim 2 wherein the integral jointing structures are located at edges of the or each ply, and the ply edges are overlapped to provide the joint.

6. A fabric according to claim 2 including at least one segment having an offset woven ply.

7. A fabric according to claim 1 comprising at least one first and one second segment, each segment including at least one ply, wherein:
   (a) the or each first segment includes, in at least one face which is substantially parallel to the plane of the fabric, a first nonwoven ply including first integral jointing structures incorporated into the first ply substantially parallel to the plane of the fabric at selected locations of the face of the first segment;
   (b) the or each second segment includes, in at least one face which is substantially parallel to the plane of the fabric, a second nonwoven ply including second integral jointing structures incorporated into the second ply substantially parallel to the plane of the fabric at selected locations of the face of the second segment; and
   (c) the first jointing structure incorporated into the or each first segment and the second jointing structure incorporated into the or each second segment ply comprise shaped structures which engage with, and interlock with, each other to provide a lap joint between the selected locations.

8. A fabric according to claim 1 comprising at least two segments including at least a first segment and at least a second segment wherein:
   (a) the or each first segment includes, in at least one face which is substantially parallel to the plane of the fabric, a first woven ply including first integral jointing structures woven into the first woven ply substantially parallel to the plane of the fabric at selected locations of the face of the segment;
   (b) the or each second segment includes, in at least one face which is substantially parallel to the plane of the fabric, a second nonwoven ply including second integral jointing structures incorporated into the second ply substantially parallel to the plane of the fabric at selected locations of the face of the second segment; and
   (c) the first jointing structure incorporated into the or each first woven ply in the first segment and the second jointing structure incorporated into the second ply in the or each second nonwoven segment comprise shaped structures which engage with, and interlock with, each other to provide a lap joint between the selected locations.

9. A fabric according to claim 8 wherein the jointing structures are interlocking rib and slot structures.

10. A fabric according to claim 1 wherein the first and the second integral jointing structures are located at at least one edge of the or each first and the or each second ply, and the edges of the first and second plies including the jointing structures are overlapped to provide the joint.

11. A fabric according to claim 10 wherein the segments are chosen the group consisting of: one single ply panel, at least two different single ply panels, one multi-ply panel, and at least two different multi-ply panels.

12. A fabric according to claim 10 including at least two segments of the same or different widths.

13. A fabric according to claim 12 wherein the widths of the strips are in the ratio of n:1, in which n is 1, and the strips are of the same width, or n is an integer.

14. A fabric according to claim 1 wherein:
   (a) the segments are chosen from the group consisting of: one single ply continuous strip, one multi-ply continuous strip, at least two identical single ply continuous strips, at least two different single ply continuous strips, at least two identical multi-ply continuous strips and at least two different multi-ply continuous strips;
   (b) the first and second segments which include the first and second plies carrying the first and second jointing structures comprise the two elongate side edges of the or each strip; and
   (c) the industrial fabric is assembled by a spiral winding technique.

15. A fabric according to claim 14 wherein the or each segment is a single ply offset woven fabric, the integral jointing structures are located in edge offsets of the or each woven ply, and the ply edges are overlapped to provide the joint.

16. A fabric according to claim 1 wherein the integral jointing structures comprise hook and loop structures.

17. A fabric according to claim 1 wherein the integral jointing structures comprise hook structures.

18. A fabric according to claim 1 wherein the integral jointing structures comprise rib and slot structures.

19. A fabric according to claim 18 wherein at a first location on one ply the jointing structures comprise rib structures, and at a second location on another ply the jointing structures comprise slot structures, with which the rib structures at the first location engage and interlock.

20. A fabric according to claim 18 wherein at a first location on one ply the jointing structures comprise both rib structures and slot structures, and at a second location on another ply the jointing structures comprise both rib structures and slot structures, with which the rib and slot structures at the first location engage and interlock.

21. A fabric according to claim 1 wherein the segments are in the form of discrete panels, each having an area that is less than the area of the fabric.

22. A fabric according to claim 1 including at least two segments.

23. A fabric according to claim 1 including at least two segments having different properties.

24. A fabric according to claim 1 including at least one segment comprising at least two plies.

25. A fabric according to claim 1 including at least one segment comprising at least two different plies.

* * * * *

UNITED STATES PATENT AND TRADEMARK OFFICE
CERTIFICATE OF CORRECTION

PATENT NO. : 6,124,015
DATED : September 26, 2000
INVENTOR(S) : Baker et al.

It is certified that error appears in the above-identified patent and that said Letters Patent is hereby corrected as shown below:

Delete drawing sheet 3 and substitute the Drawing sheet consisting of Figs. 16-17 as shown on the attached page;

<u>Column 12,</u>
Line 35, delete "FIG. 28" and replace by -- FIG. 27 --;
Line 45, delete "direction 33" and replace by -- direction 3 --;

<u>Column 14,</u>
Line 40, delete "spaces." and replace by -- spaces 64. --;

<u>Column 17,</u>
Line 13, delete "chosen the" and replace by -- chosen from the --.

Signed and Sealed this

Sixth Day of June, 2006

JON W. DUDAS
*Director of the United States Patent and Trademark Office*